(12) United States Patent
Kolawa et al.

(10) Patent No.: US 7,904,802 B1
(45) Date of Patent: Mar. 8, 2011

(54) SYSTEM AND METHOD FOR SOFTWARE CODE REVIEW

(75) Inventors: Adam K. Kolawa, Bradbury, CA (US); Marek Kucharski, Cracow (PL)

(73) Assignee: Parasoft Corporation, Monrovia, CA (US)

( * ) Notice: Subject to any disclaimer, the term of this patent is extended or adjusted under 35 U.S.C. 154(b) by 837 days.

(21) Appl. No.: 11/559,340

(22) Filed: Nov. 13, 2006

Related U.S. Application Data

(63) Continuation of application No. 11/507,720, filed on Aug. 21, 2006, now abandoned.

(60) Provisional application No. 60/713,262, filed on Aug. 31, 2005.

(51) Int. Cl.
*G06F 17/00* (2006.01)

(52) U.S. Cl. ......... 715/230; 715/751; 717/100; 717/101; 705/300; 705/301; 707/608

(58) Field of Classification Search .................. 715/255; 717/124–126
See application file for complete search history.

(56) References Cited

U.S. PATENT DOCUMENTS

| | | | | |
|---|---|---|---|---|
| 7,386,831 | B2* | 6/2008 | Flanagan | 717/103 |
| 7,596,778 | B2* | 9/2009 | Kolawa et al. | 717/126 |
| 2001/0010329 | A1* | 8/2001 | Ohashi | 235/375 |
| 2003/0131313 | A1* | 7/2003 | Flanagan | 715/500 |
| 2004/0085354 | A1* | 5/2004 | Massand | 345/751 |
| 2005/0050521 | A1* | 3/2005 | Chang | 717/124 |
| 2005/0114841 | A1* | 5/2005 | Moskowitz et al. | 717/126 |
| 2005/0120127 | A1* | 6/2005 | Bradley et al. | 709/231 |
| 2005/0188214 | A1* | 8/2005 | Worley et al. | 713/187 |
| 2006/0026502 | A1* | 2/2006 | Dutta | 715/511 |
| 2006/0059453 | A1* | 3/2006 | Kuck et al. | 717/100 |
| 2007/0011659 | A1* | 1/2007 | Venolia | 717/127 |
| 2008/0034275 | A1* | 2/2008 | Edd et al. | 715/200 |
| 2009/0044178 | A1* | 2/2009 | Aridor et al. | 717/143 |
| 2010/0144380 | A1* | 6/2010 | Washburn | 455/466 |

OTHER PUBLICATIONS

Johnson, Philip, "An Instrumented Approach to Improving Software Quality through Formal Technical Review", 1994, pp. 113-122.*
Johnson, Philip and Danu Tjahjono, "Improving Software Quality through Computer Supported Collaborative Review", 1993, pp. 61-76.*
Augustin, Larry, et al. "Accellerating Software Development through Collaboration", May 19-25, 2002, pp. 559-563.*
Baker, Richard, "Code Reviews Enhance Software Quality", pp. 570-571, 1997.*
John Gintell, John Arnold, Michael Houde, Jacek Kruszelnicki, Roland McKenney and Gérard Memmi; "Scrutiny: A collaborative inspection and review system"; Software Engineering—ESEC '93; Lecture Notes in Computer Science, 1993, vol. 717/1993, 344-360.*

* cited by examiner

*Primary Examiner* — Doug Hutton
*Assistant Examiner* — Benjamin J Smith
(74) *Attorney, Agent, or Firm* — Christie, Parker & Hales, LLP

(57) ABSTRACT

A method and system for efficient code review performed during the software development. The method and system include storing information about a plurality of authors and reviewers; detecting code to be reviewed by analyzing a code repository with respect to recent code modifications; creating a code review invitation according to the stored information about a plurality of authors and reviewers; distributing the code review invitation to a respective reviewer; recording comments for review code from the respective reviewer; measuring coverage of the reviewed code; applying metrics to the code review invitations and the comments; measuring code review characteristics based on the applied metrics.

7 Claims, 4 Drawing Sheets

| Reviewer | Pending before time period | Authors | New | Closed no issues | Issues created | Pending after time period | Issues | |
|---|---|---|---|---|---|---|---|---|
| | | | | | | | Pending | All |
| John | 5 | Jim | 4 | 6 | 0 | 3 | 0 | 0 |
| Jim | 6 | John | 4 | 7 | 1 | 2 | 0 | 2 |
| Michael | 1 | Greg | 2 | 1 | 2 | 0 | 2 | 5 |
| Peter | 6 | Mark | 12 | 7 | 3 | 8 | 0 | 4 |
| Total | 18 | - | 22 | 21 | 6 | 13 | 2 | 11 |

FIG. 4

SYSTEM AND METHOD FOR SOFTWARE CODE REVIEW

CROSS-REFERENCE TO RELATED APPLICATION

This Patent Application is a continuation of U.S. patent application Ser. No. 11/507,720, filed Aug. 21, 2006 now abandoned, which claims the benefit of the filing date of U.S. Provisional Patent Application Ser. No. 60/713,262, filed on Aug. 31, 2005 and entitled "SYSTEM AND METHOD FOR SOFTWARE CODE REVIEW," the entire content of which are hereby expressly incorporated by reference.

FIELD OF THE INVENTION

The present invention relates generally to computer software; and more particularly to an efficient and flexible system and method for software code review.

BACKGROUND OF THE INVENTION

One of the major issues in the process of developing computer software applications is assuring appropriate level of quality. One of the methods to achieve higher quality is performing so called code review or code inspection, among others. Typically, newly created or modified code is analyzed by a senior developer in a search for potential defects. Often the author of the code has to explain to the reviewer what the code is intended to do. In most cases, such process is completely manual. The code developer has to contact the reviewer to approve the changes, before committing changes to the repository. Then, they either print modified piece of code or analyze the code displayed on the screen of a computer. If a potential defect or other deficiency is detected, the developer and the reviewer discuss the specific code fragment. However, such process has some drawbacks.

First, the process assumes that the reviewer is always available. While it may be true if this is primary task for the reviewer, very often the reviewer is just another developer and has other primary tasks and may not be available. This may block the code author from committing the changes into the repository. Another problem is that the author may fail to notify reviewer about changes, or may forget about one or two files which were modified. That way, some changes would not be reviewed. A major problem is that after review is done, there is no trace of such review. This practically renders monitoring and improving of the review process impossible. Considering all of the above, a need for a system which would automate most of the manual part of the review and which would keep track of the process and the changes is quite apparent.

SUMMARY OF THE INVENTION

In one embodiment, the present invention is a method and system for efficient code review performed during the software development. The method and system provide a framework for automated creation of code review invitations, distributing code review invitations, recording reviewers remarks and keeping track of the reviewer/author interactions. The method and system are also capable of registering and reporting statistics related to code review process.

In one embodiment, the present invention is a method for code review of a computer software. The method includes storing information about a plurality of authors and reviewers; detecting code to be reviewed by analyzing a code repository with respect to recent code modifications; creating a code review invitation according to the stored information about a plurality of authors and reviewers; distributing the code review invitation to a respective reviewer; recording comments for review code from the respective reviewer; measuring coverage of the reviewed code; applying metrics to the code review invitations and the comments; measuring code review characteristics based on the applied metrics.

In one embodiment, the present invention is a system for code review of a computer software. The system includes a code repository for storing code for computer software; a code scanner for analyzing the code repository and preparing a code review invitation; a server for distributing the code review invitation, recording process events, and supporting conversation between a developer and a reviewer; and a user interface (UI) for providing navigation from comments to a file editor for modifying the code and comments about code review in the code repository.

In one embodiment, the present invention is a method for code review of a computer software. The method includes storing code for computer software in a code repository; storing information about a plurality of authors and reviewers; detecting code to be reviewed by monitoring recent code modifications in the code repository; creating a code review invitation according to the stored information about a plurality of authors and reviewers; distributing the code review invitation to a respective reviewer; recording comments for review code from the respective reviewer; applying metrics to the code review invitations and measuring code review characteristics responsive to the applied metrics. The characteristics may include the quality of the review process, time spent on the process, number of issues detected, and the like.

BRIEF DESCRIPTION OF THE DRAWINGS

FIG. 4 is an exemplary statistics report, according to one embodiment of the present invention.

DETAILED DESCRIPTION

In one embodiment, the present invention provides a process for automated code review by analyzing a code repository and creating code review invitations based on author and reviewer mapping. The system and method of the present invention distributes code invitations to the reviewers, records review comments associated with code pieces, distributes comments to the authors and vice versa, and records the review comments and analysis of the process based on those recordings.

In one embodiment, the present invention is a software application for computer aided code review which automates creation of code review invitations, supports modification analysis, supports conversation between an author and a reviewer, and supports monitoring and analyzing the process of manual code review. The invention measures code review characteristics such as, the quality of the review process, time spent on the process, number of issues detected, various types of ratios, and the like.

Figure 1:
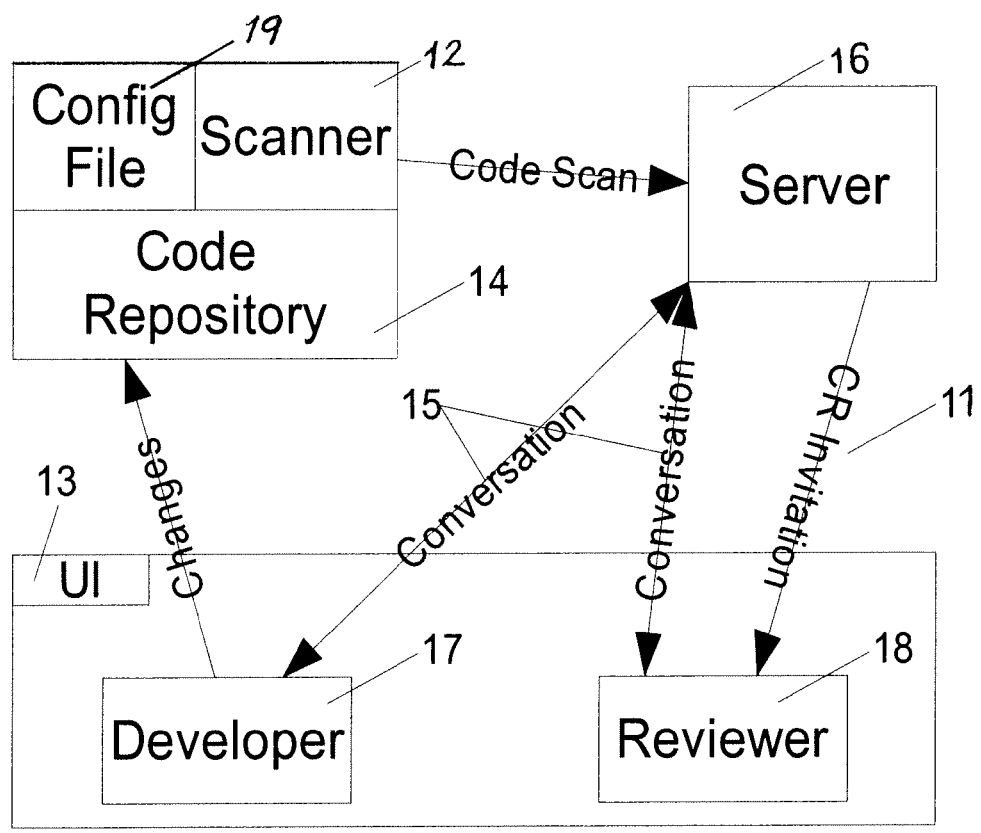
FIG. 1 is an exemplary system diagram according to one embodiment of the present invention.

FIG. 1 is an exemplary system diagram according to one embodiment of the present invention. The system includes: a code scanner 12 for analyzing a code repository 14 and preparing a code review invitation 11; and a distribution and process recording center 16 (e.g., a server) for distributing code review invitations 11, recording process events, and supporting conversation 15 between a developer (author) 17 and a reviewer 18. Additionally, the system includes a user interface (UI) 13 which simplifies subsequent file revisions and code commenting, supports author/reviewer conversation and allows navigation from comments to the file editor for modifying the code, comments, and the files in the code repository.

The communication between author (developer) and reviewer takes place through the distribution and process recording center, for example, server 16. Server 16 also keeps track of the communication between the author and the reviewer such that the statistics can be calculated and reported. Such statistics may be invaluable since it allows the developer to measure what the actual efficiency of the code review process is.

For example, if a reviewer performed 10 inspections during a given time period and found 5 defects, one of the metrics may be the number of defects per inspection, which would be 0.5 in this case. More details of the type of statistics are explained below.

Another type of statistics is related to determining which parts of the file have been reviewed and by whom, and which parts have not been reviewed. This establishes the coverage of the review process. Since the system keeps track of files and revisions which where reviewed, this information can be obtained. For each revision, the invention determines which lines in a file were committed by that revision. Therefore, it is possible to show which lines were reviewed, when and by whom, and which lines were not reviewed or at least there is no information in the system about such review. Having this information, the invention is capable of generating a graph which presents number of lines reviewed against total number of files within given time period.

The server also stores a configuration file 19 for the process. In one embodiment, the configuration file 19 includes code review assignments, for example, who reviews which code, which part of the code repository should be scanned for modifications and how to connect to it, and the like.

The scanner 12 is responsible for scanning source repository and preparing code review invitations. In one embodiment, the UI 13 is a plug-in to an Integrated Development Environment (IDE) or stand alone program, which allows the reviewer 18 to browse through code review invitations, comment code, assign status to the code review package, and conduct conversation/discussion with the developer 17. At the same time, the UI allows the developer to easily browse through the comments from the reviewer, navigate from comment to source code in order to apply the recommended fixes, and reply to reviewer's comments.

The server 16, stores and analyzes recorded review events, and delivers reports.

In one embodiment, the code scanner 12 scans the code repository 14 to identify changes 10 introduced by the developer(s) 17. In other words, scanner looks what revisions of the code were committed to the repository and by whom in a given time period. By default, this time period may be the last day. If the time period is longer then one day, changes may be grouped by day. Changes are then analyzed and an invitation to code review is created.

A single invitation includes a list of all file revisions checked in to the repository by each person during the specified period. Therefore, for a given day the number of distinct created invitations equals the number of authors who have made any revisions that day. Such invitation is then distributed to reviewers based on assignments defined and stored, for example, within the server 16.

A reviewer 18 then receives the invitation and analyzes changes committed by the developer. The system provides a set of utilities to make such analysis easy. This includes file comparator, syntax highlighting, access to code repository for further information, and the like. If the reviewer has no remarks, she sets a status to "done" to complete the given code review. Otherwise, the reviewer places comments on each affected piece of code and sets the status to "needs fixes," for example.

The code review package is then automatically distributed to the developer, who can either fix the code or respond to the reviewer. In one embodiment, this interaction takes place through the server. Additionally, the server keeps track of developer/reviewer interaction(s) and gathers statistics to be analyzed later.

The process of code review driven by the present invention starts when the developer modifies some files. For example, lets assume that two files, File1 and File2, were modified by the developer. During source repository scan, the system detects that the fifth revision of File1 and the seventh revision of File2 were modified. The scanner prepares a code review invitation of a form:

| Code Review Package [Date] | |
| --- | --- |
| File1 | Revision 5 |
| File2 | Revision 7 | and stores it to in the server. A sample scanner configuration file may look like:

```
-----------------------
scanner.id=scanner1
scanner.fail.on.error=false
report.verbosity=2
report.stdout=true
report.file=false
report.smtp.host=mail.example.com
report.email=cr_admin@example.com
repository1.type=cvs
repository1.cvs.root=:pserver:
cw_scanner@devel1.example.com:/home/devel/cvs
repository1.cvs.pass=Aed<,dZ,
repository1.startpoint1=project1
repository1.startpoint2=project2
recipient.type=tcm
recipient.tcm.host=main1.example.com
recipient.tcm.port=
recipient.tcm.login=codereview
recipient.tcm.password=codereview
#filters
path.accept.re=
path.reject.re=(.*\\.jar)/(.*\\.dll)/(.*\\.sa)/(.*\\.so)
default.reviewer=johnk
#codereview
user1.name=jims
user1.reviewer1=
user1.qa1=victorm
user2.name=davidw
user2.reviewer1=mattr
user2.qa1=victorm
user3.name=mattr
user3.reviewer1=davidm
user3.reviewer2=johnk
``` user3.qa1=victorm
----------------------

The first section of the configuration file sets general scanner options, for example, an identifier, what to do with an identified error, level of verbosity, how execution should be logged, and the like.

There may be more then one code repositories. In one embodiment, entries for repository and for other sections, are of form <object><number>.<attribute><number>. Here, object is a repository, number is optional and denotes occurrence of a given object or attribute.

Therefore, repository1.type represents attribute "type" for the first repository defined;
repository1.cvs.root represents attribute "cvs.root" for the first repository, repository1.startpoint1 is a first module to scan from the repository, and
repository1.startpoint2 would be a second module, and so on.

A recipient section points to the place (for example, in the server) where results of the scan are to be sent. A filter section allows defining what file types should be scanned or excluded from the scan. The last section is a section which defines associations between actors in the code review process.

According to one embodiment of the present invention, there are three basic roles. An author is a person, usually the developer, who makes the modifications and commits them to the repository. A reviewer is a person, usually other than the developer, who is responsible for obtaining the modifications from a given author for a review. A quality assurance (QA) person controls whether reviews are done and how well they are done.

Exemplary entries shown in the above example correspond to the situation where default reviewer is a user with login "johnk". Author "jims" has a default reviewer. Developers "davidw" and "mattr" are reviewers to each other. But "mattr" has also additional reviewer, i.e., "johnk". Furthermore, the QA for all the three has a login name as, "victorm".

When the scan is completed and the review invitation is created and stored on the server, it is time for reviewer's action. Hereinafter, "review" is referred to both to the process and the package which contains the files to be reviewed, the review comments, the replies from the authors, and the like. Thus, invitation to review is also a "review."

Figure 2:
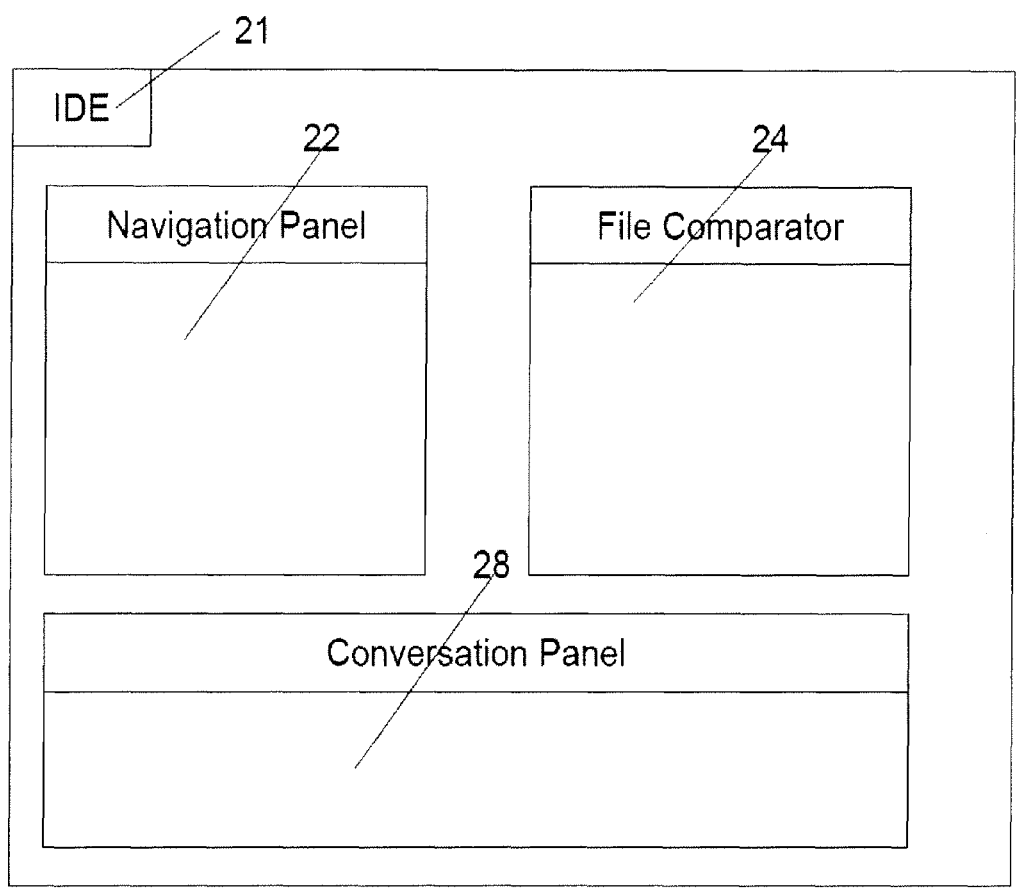
FIG. 2 is an exemplary UI, according to one embodiment of the present invention.

FIG. 2 is an exemplary UI, according to one embodiment of the present invention. The reviewer can see entries in a navigation panel 22 upon opening the IDE 21. Reviews waiting to be examined are displayed in the UI. These may be freshly created invitations from various authors and/or during different times. Alternatively, these may be reviews which are commented on, but not closed yet. Some of the displayed reviews require author action, some already include replies from the author and require further reviewer actions.

Reviewer then selects a review which she wants to work with and opens it. Opened review displays on navigation panel 22 its related files and fills a conversation panel 28 with the up-to-now history of what has happened with the review. This includes all reviewers' comments and all replies for the displayed review. If there are more then one reviewer, interactions with all the reviewers are presented.

Figure 3:
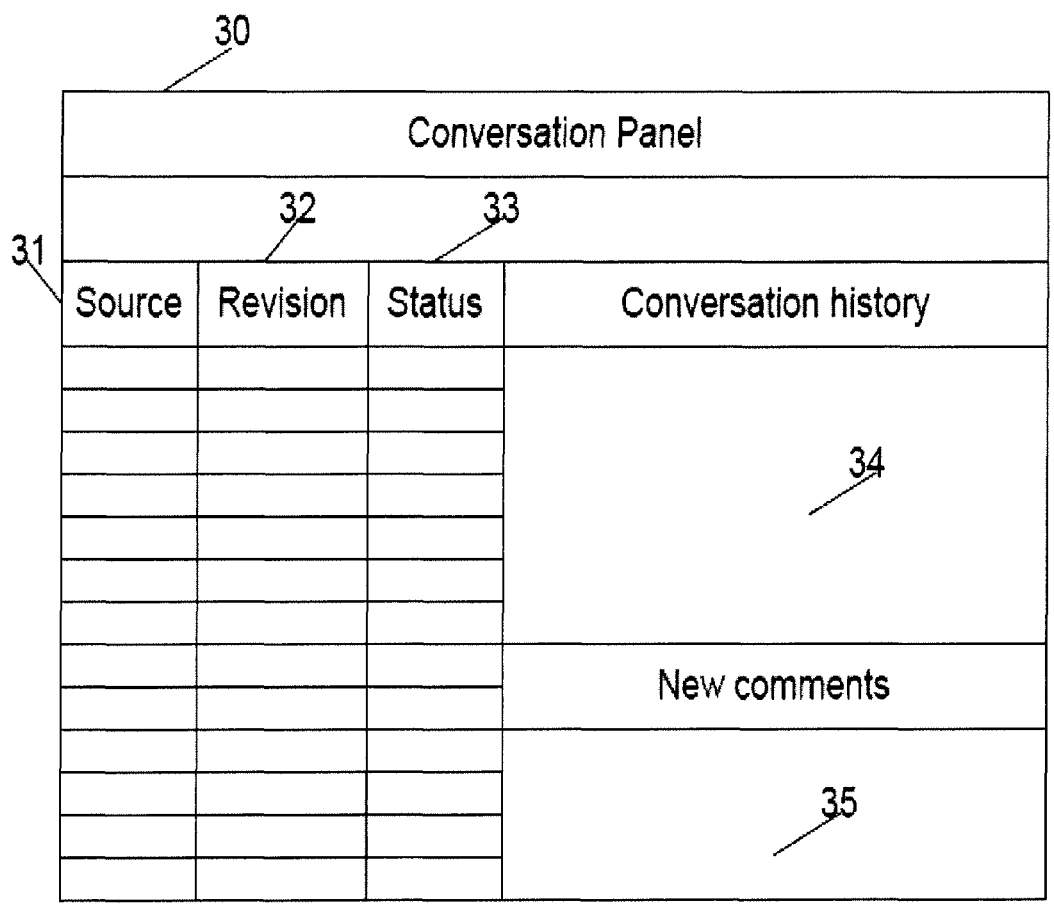
FIG. 3 is an exemplary tracking panel layout; according to one embodiment of the present invention.

An exemplary conversation panel layout 30 is depicted in FIG. 3. As shown on the left side, there is a list of so called "threads" of comments and/or replies. Each thread is related to a given file 31 and revision 32 and has some status assigned 33. Examples for the status include "waiting for review", "author's action", "completed," and the like. When a given entry is selected, on the right side one can scroll through comments in a conversation history panel 34 and add new comments using "new comments" panel 35.

In one embodiment, one or more verification tools are executed to statically analyze and verify the code. The results of the execution of the verification tools are then sent to a reviewer as a part of code review process. UML diagrams may also be sent to the reviewer as a part of code review process.

FIG. 4. is an exemplary statistics report, which can be used to calculate various metrics characterizing code review process. Starting from the left to the right of the report, area 41 is a column with a reviewer name while area 43 is a column with the author's name. Code review invitations number pending at the beginning of analyzed time period is shown in a column 42. The number of newly created code review invitations is shown in column 44. The number of review invitations closed without any issue raised is shown in column 45, while number of those where at least one issue was created in column 46. The number of code review invitations pending at the end of analyzed time period is shown in a column 47. Columns 48 and 49 show individual issues raised, from which those still pending are shown in column 48.

For example, in the fifth row, the reviewer is a person named Peter. At the beginning of the period, Peter had 6 pending code review invitations. During the analyzed period, he received 12 new code review invitations from an author named Mark. Therefore, together in the analyzed period Peter had 6+12=18 code review invitations to work on. From that number, 7 were closed with no issues raised. In 3 cases, issues were raised. This means that Peter analyzed 7+3=10 code review invitations during the analyzed time period. As expected, 8 code review invitations were left pending after the analyzed time period.

As additional information, one can see that 4 individual issues were created—meaning that in one case 2 issues were created for one code review invitation, and no pending issues left—meaning they were taken care of by the author. From the last row one can draw some overall process metrics. For example, the throughput was 21+6=27 code review invitations analyzed in a given time period. Defective code review invitations ratio was 6/27=22%. The number of issues raised per analyzed package (code review invitation) was 11/27=0.41 and the number of issues raised per defective package was 11/6=1.83.

Referring back to FIG. 2, a major panel for the reviewer is files comparator 24. In one embodiment, when the reviewer selects a given file from the review to work on, for example, File1 revision 5 from the above example, this file is retrieved from the source repository in two versions—the revision which is to be reviewed and one prior revision before. Both revisions are then compared by the file comparator 24 and the result is presented to the reviewer. The reviewer can then concentrate only on modifications made by the author for that particular revision. The reviewer can easily navigate through the code. To make a comment, the reviewer selects a piece of code in the file comparator and creates "code review issue" or in other words new conversation thread.

The code review issue is a single comment related to a given file at a given line, which includes comments, it's own status (e.g., fixed, or replied, etc.), and usually a copy of the piece of code which is considered not correct or questionable. The issues created by the reviewer are visible in a conversation panel 28. The reviewer can also create a comment which is not assigned to a particular line in a code or even to a particular file.

When the review is ready to be approved or needs developer's action, the reviewer closes the review with an appropriate status. If the review is accepted (that is, modifications listed in a review package are accepted), a status, for example, "completed" is assigned to the review. If the review requires author's attention, a status, for example, "author's action" is assigned to the review. If so, the author who is using a similar UI as the reviewer sees the review on his navigation panel with a flag to indicate that there are comments to look at, or the actual comments may be displayed on his navigation panel.

The invention is capable of collecting information such as determining number of defects found, cost, time spent, and amount of code reviewed in a time period. It then can generate a graph for one or more of the above information and for interactions among the above information.

In one embodiment, the author's UI looks the same as the reviewer's UI. That way, a notion when user can be an author but at the same time a reviewer to another author is well supported. An author can see reviews of his modifications in a navigation panel. Only the reviews which require the author's attention are shown in the navigation panel. The author opens the review and all the comments for that review are displayed in the conversation panel.

In one embodiment, the comments are grouped in comment threads. Each comment may have respective line numbers in the code to which the comment relates. The author can navigate from a comment to a file in an editor. This helps to fix the code if required. The author may also respond to reviewer's comments without modifying the code. A response may explain further rationales behind the author's code or request additional explanation for the comments from the reviewer. Once the author is done with his action items, he can close the review or reassign it again to a reviewer for further conversation (comments) or for acceptance.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A computer implemented method for code review of a computer software, the method comprising:
    storing information about a plurality of authors and reviewers in a computer memory, wherein each author has one or more assigned reviewers;
    electronically scanning a source code of the computer software to detect portions of the source code modified during a given time period;
    electronically determining code to be reviewed from the detected modified portions of the source code;
    automatically creating a code review invitation including verification results of executing one or more verification tools on the computer software during the given time period, according to the stored information about a plurality of authors and reviewers;
    electronically identifying one or more respective assigned reviewers and distributing the code review invitation to the identified respective assigned reviewers, based on the stored information;
    electronically recording comments for reviewed code from the respective assigned reviewers;
    electronically determining which parts of the code in a file have been reviewed and by whom, and which parts of the code in the file have not been reviewed;
    applying metrics to the code review invitations and the comments;
    electronically determining a number of pending code review invitations during the given time period, from a number of new code review invitations received and a number of code review invitation completed during the given time period; and
    displaying the determined number of pending code review invitations during the given time period in a graph.

2. The method of claim 1, wherein the code review invitation includes a list of file revisions checked in to the code repository during the given time period.

3. The method of claim 1, further comprising measuring code review characteristics based on the applied metrics.

4. The method of claim 1, further comprising measuring code review characteristics by determining one or more of the group consisting of number of defects found, cost, time spent, and amount of code reviewed in the given time period.

5. The method of claim 4, further comprising electronically generating a graph for the one or more of the group number of defects found, cost, time spent, and amount of code reviewed in the given time period.

6. A system for code review of a computer software comprising:
    a computer memory including a code repository for storing code for computer software and storing information about a plurality of authors and reviewers in a computer memory, wherein each author has one or more assigned reviewers;
    a computer including a code scanner for scanning a source code of the computer software to detect portions of the source code modified during a given time period and determining code to be reviewed from the detected modified portions of the source code;
    one or more server computers for identifying one or more respective assigned reviewers and distributing an automatically created code review invitation including verification results of executing one or more verification tools on the computer software during the given time period, recording process events, supporting conversation between an author and a reviewer, and determining a number of pending code review invitations during the given time period, from a number of new code review invitations received and a number of code review invitations completed during the given time period; and
    a user computer including a user interface (UI) for providing navigation from comments to a file editor for modifying the code and comments about code review in the code repository, wherein the UI is configured to display the determined number of pending code review invitations during the given time period in a graph, wherein the computer including a code scanner or the one or more server computers are configured to determine which parts of the code in a file have been reviewed and by whom, and which parts of the code in the file have not been reviewed, and wherein the server computer is configured to measure coverage of the reviewed code, apply metrics to the code review invitations and the comments, and analyze a process for the code review based on the applied metrics.

7. The system of claim 6, wherein the code review invitation includes a list of file revisions checked in to the code repository during the predetermined period.

* * * * *